May 22, 1923.
F. W. JURY
1,456,240
GEAR CUTTING MACHINE
Filed June 9, 1921
6 Sheets-Sheet 2
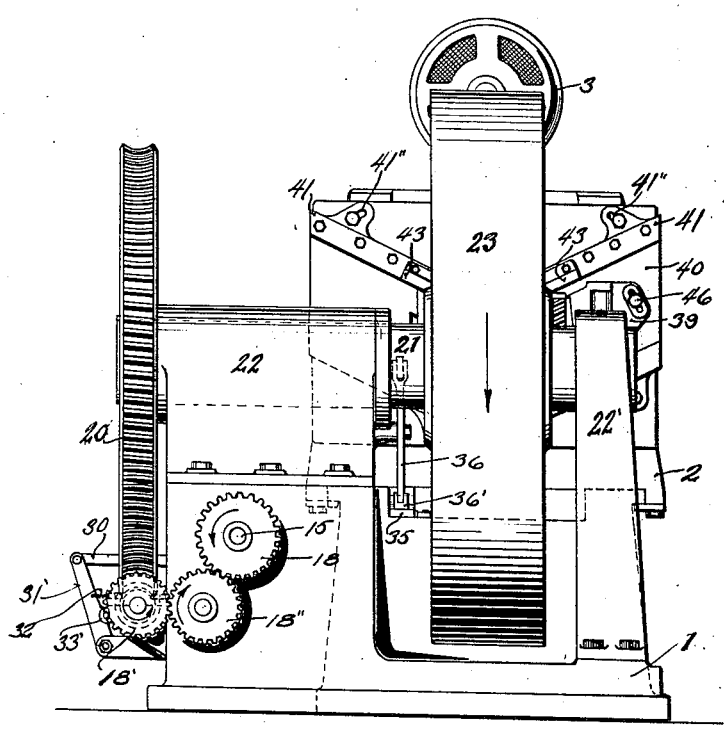
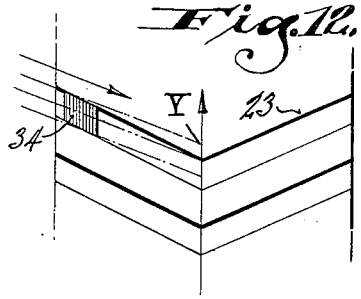
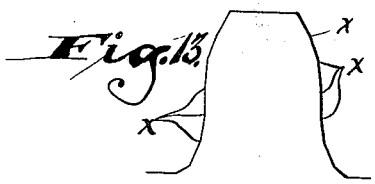
INVENTOR.
Frank W. Jury
BY
Young and Young
ATTORNEYS.

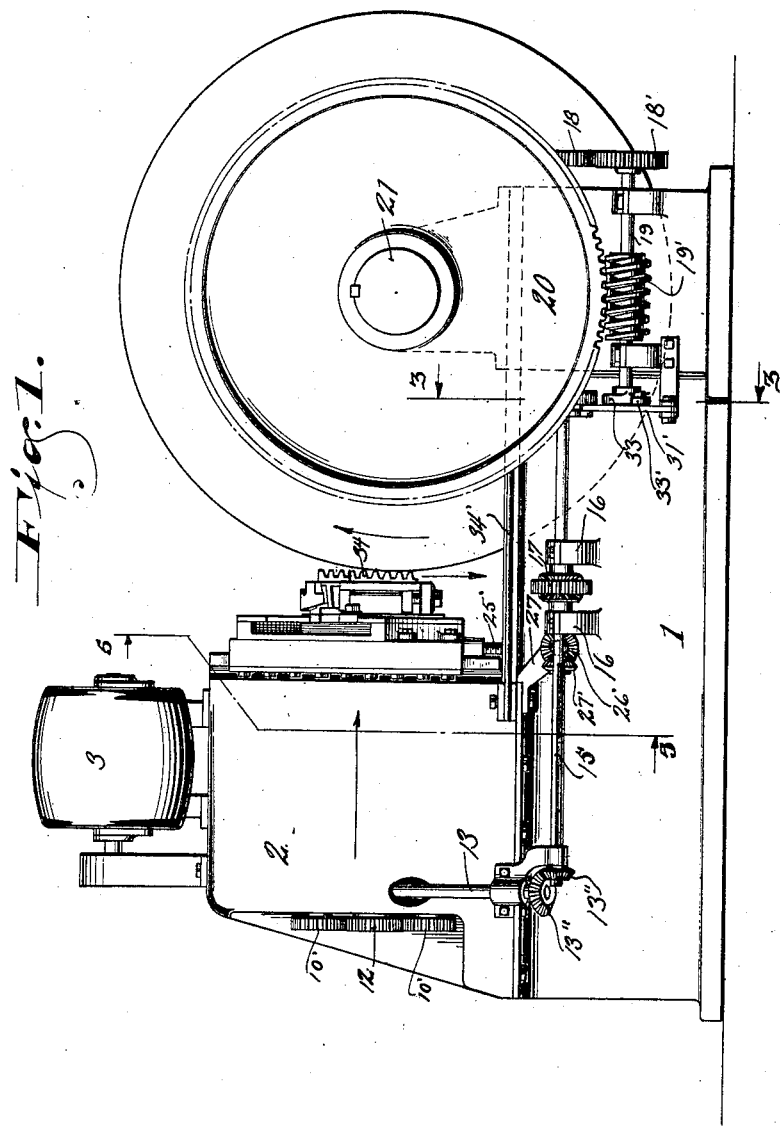

May 22, 1923.
F. W. JURY
1,456,240
GEAR CUTTING MACHINE
Filed June 9, 1921       6 Sheets-Sheet 3
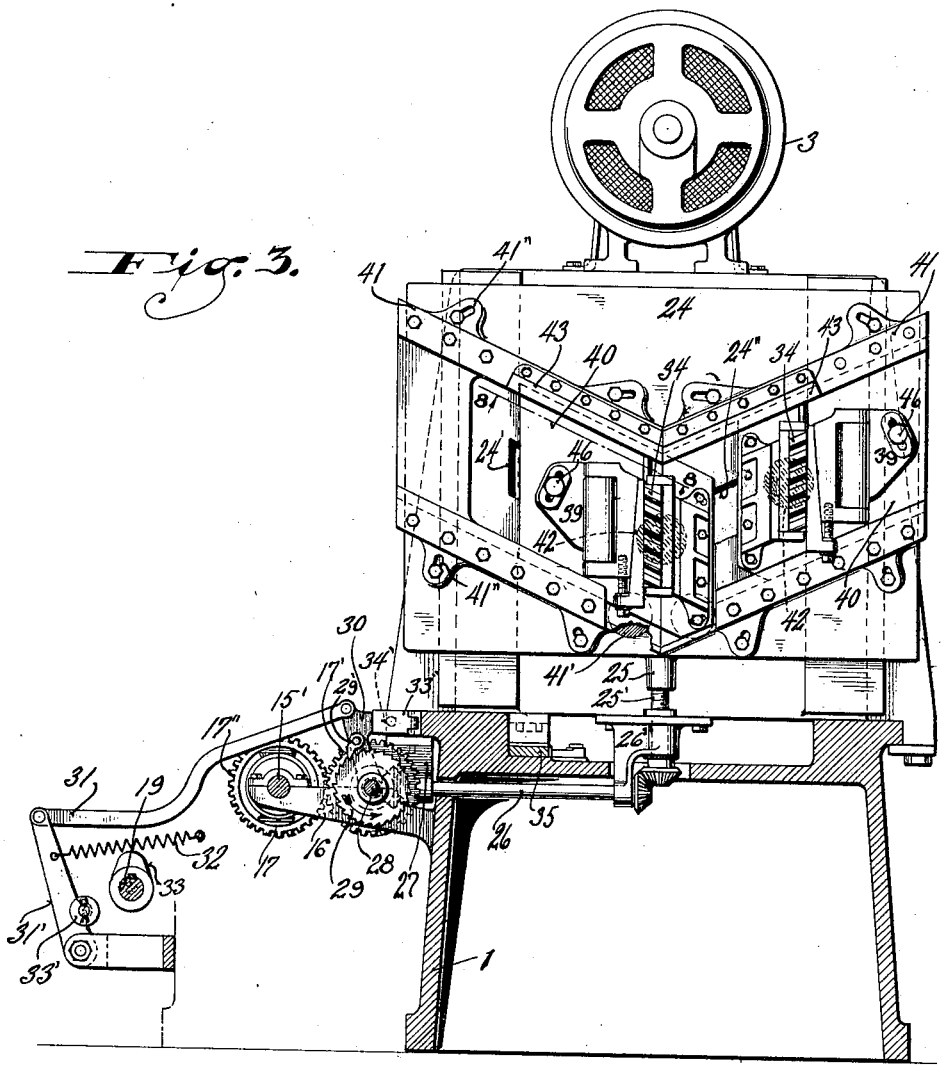
INVENTOR.
Frank W. Jury
BY Young and Young
ATTORNEYS.

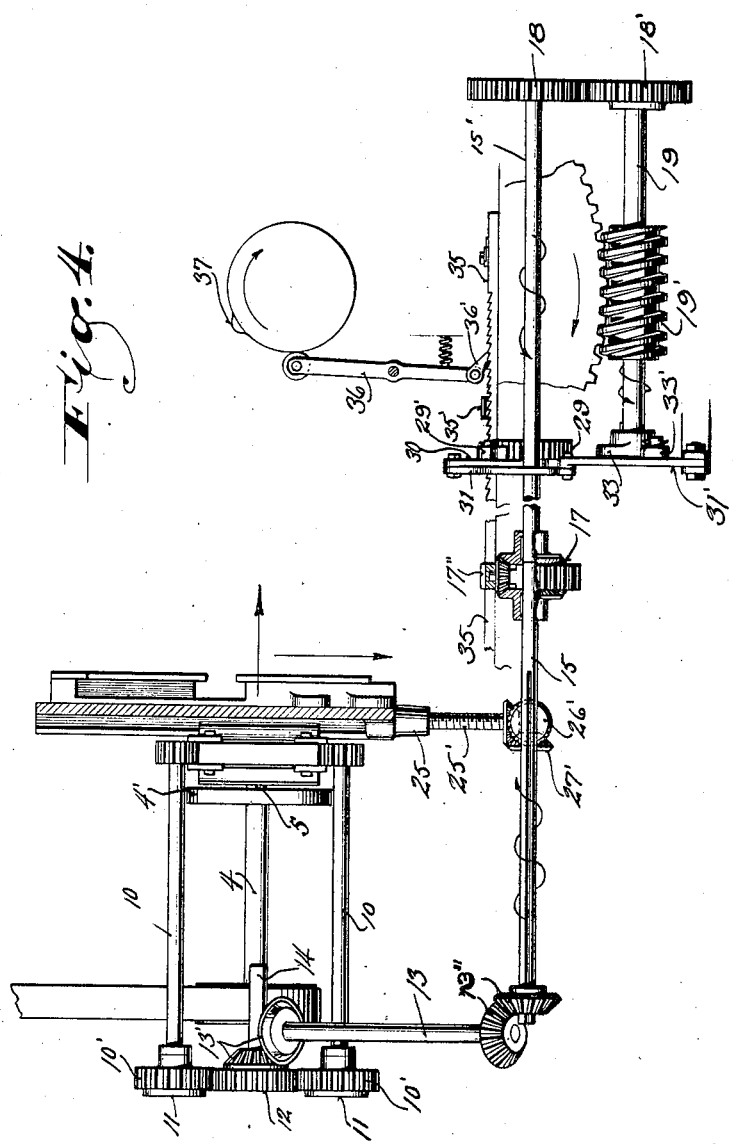

May 22, 1923.
F. W. JURY
1,456,240
GEAR CUTTING MACHINE
Filed June 9, 1921
6 Sheets-Sheet 5
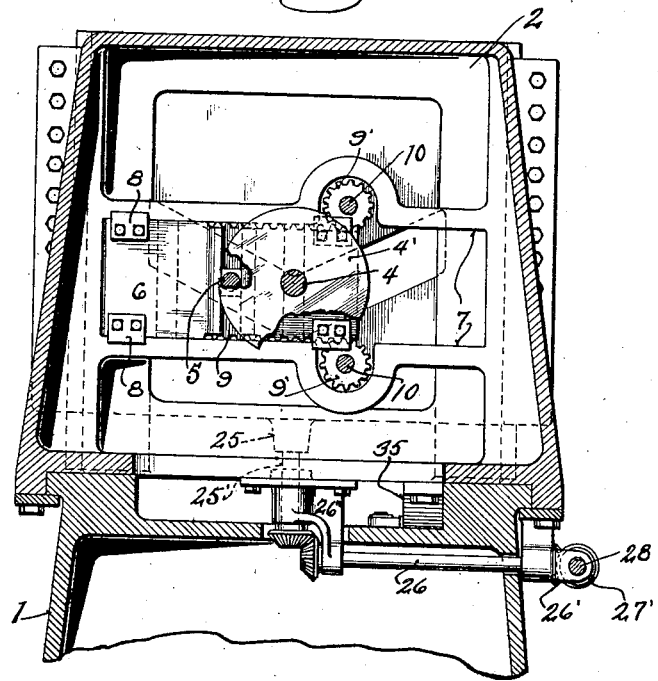
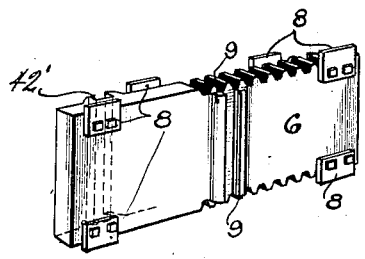
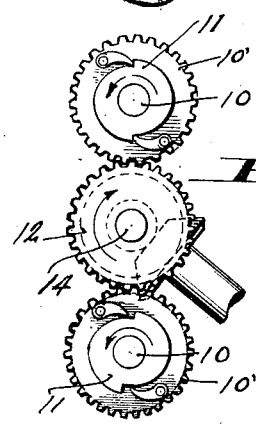
INVENTOR.
Frank W. Jury
BY Young and Young
ATTORNEYS.

May 22, 1923.

F. W. JURY

GEAR CUTTING MACHINE

Filed June 9, 1921

INVENTOR.

Frank W. Jury

BY Young and Young

ATTORNEYS

Patented May 22, 1923.

1,456,240

UNITED STATES PATENT OFFICE.

FRANK WARDEN JURY, OF MILWAUKEE, WISCONSIN.

GEAR-CUTTING MACHINE.

Application filed June 9, 1921. Serial No. 476,188.

*To all whom it may concern:*

Be it known that I, FRANK WARDEN JURY, a subject of Great Britain, and resident of Milwaukee, in the county of Milwaukee and State of Wisconsin, have invented certain new and useful Improvements in Gear-Cutting Machines; and I do hereby declare that the following is a full, clear, and exact description thereof.

My invention refers to machines for cutting spur gears, spiral and double helical or herring-bone gears.

The primary object of my invention is to cut a double helical gear, wherein the center gap is eliminated to thereby reduce the face of the gear, without diminishing strength and to thus increase the strength of gear teeth of a predetermined width or face.

Other objects of my invention are:

To provide means whereby the cutting of gears of this general type are materially simplified and the cycle of operation expedited, due to the fact, that the dividing or indexing motion is accomplished during the cutting of the teeth.

To provide a pair of cutters of the rack type, disposed at opposite angles, and adapted to reciprocate alternately in a cutting operation toward the center of the blank which is being rotated, whereby one cutter operates to rough out the tooth from the peripheral edge, directed to the center, and the other cutter thereafter comes into action to rough out the succeeding tooth, in such manner that the completed herring-bone gear is sharply defined at its apex, by reason of the cutters working sharply up to the line of radiation.

To provide alternately operative cutters which travel upon an angle slightly less than of the predetermined angle of the helical teeth, bearing in mind that the periphery of the blank is being rolled during each cutting operation, which movement is transverse to the line of travel of the cutter. This variation in angle is for the purpose of aiding in properly generating the teeth, and for the further purpose of indexing, that is to say, properly positioning the blank after each cut to be ready for the next tooth space or cut.

To provide an automatic machine having alternately reciprocative angularly disposed cutters, arranged to cut or rough out the gears in a succession of series of uniform cuts, from the top to the base of the gear, each uniform cut being affected in a cycle of the blank followed by a feed of the cutters towards the center of the rotating blank for the next cut.

To provide a machine of the above character, with means for generating the teeth after the final cut, wherein the cutters are fed tangentially with relation to the blank, and in the opposite direction of travel of said blank, to thus smooth off corners that will develop upon the faces of the roughly cut teeth.

To provide a gear cutting machine, wherein a continuous rotative gear blank is operated upon by a pair of alternatively reciprocative rack-cutters, having angularly disposed guides adapted to direct the cutters upon the surface of the blank transversely thereof, and at a slightly less angle than the angle of the teeth to be cut, whereby each cut is uniform throughout, due to the rolling motion which is synchronized with the movements of the cutters, together with means for feeding the cutters toward the face of the blank a predetermined distance during each revolution thereof, whereby a complete series of teeth are cut and roughly generated, in a successional step, there being also provision for thereafter generating the teeth by bringing into action an independent tangential movement of the cutters with relation to the blank, said movement being in the opposite direction of travel to that of the blank.

With the above and other minor objects in view, the invention consists in certain peculiarities of construction, and combination of parts, as are hereinafter set forth with reference to the accompanying drawings and subsequently claimed:

In the drawings:

Figure 1 represents a side elevation of a gear cutting machine, embodying one exemplification of my invention.

Figure 2 an end view of the same, showing a gear blank mounted in position for operation.

Figure 3 is a sectional view looking in the same direction, the section being indicated by line 3—3 of Figure 1.

Figure 4 is a fragmentary side elevation of certain of the working parts diagrammatically expressed and with certain parts in section to more clearly illustrate structural features, the view as a whole, being taken as looking toward the side of the machine as illustrated in Figure 1, with the frame parts removed to skeletonize the structure.

Figure 5 is a detailed sectional view of the rack portion of the machine, the section being taken on the line as indicated by 5—5 of Figure 1, the section strictly assuring means for feeding alternate reciprocative rack-tooth cutters.

Figure 6 is a detailed perspective view, of a horizontally reciprocative rack primarily employed for imparting movement to gear cutting tools.

Figure 7 is a detailed rear view of the train of gears, whereby motion is imparted from the reciprocative rack to feed mechanism.

Figure 11 is a detailed plan view, partly in section, illustrating the feed gear connection for imparting tangential movement to the rack-cutters.

Figure 8:
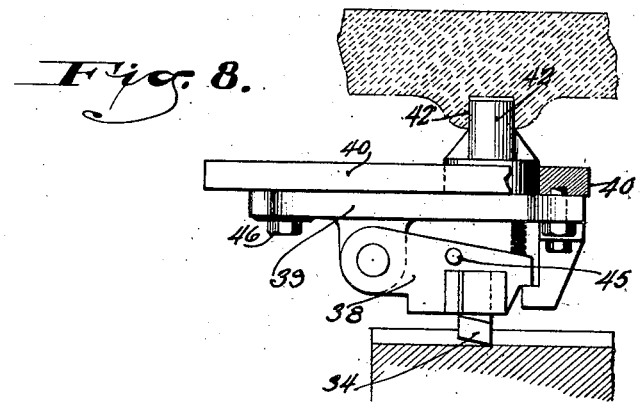
Figure 8 is a detailed plan view, illustrating one of the rack-teeth cutters, the parts being in section to show certain details of construction, the other parts in dotted lines to indicate the connection between the rack cutters, the horizontally reciprocative rack shown in full lines in Figure 6.

Figure 12 is a diagrammatic face view, with a fragment of the blank associated with the rack-tooth cutter, showing particularly the difference in angle between the travel of the cutters and the angle of the herring-bone gear developed upon the periphery of said blank, and Figure 13 is a diagrammatic magnified view, of a tooth showing a series of straight cuts from its crown to base, which are more or less polygonal in their contour.

Referring by characters to the drawings, 1 represents a bed having slidably mounted thereon a housing 2, which housing carries a motor 3 that is in gear drive connection with a shaft 4 journaled in the housing and which carries a disk 4′ at its forward end, having a crank pin 5 extending therefrom. The crank pin engages a vertically disposed channel in a reciprocative rack-plate 6, as best shown in Figures 5 and 6. The rack-plate is mounted and guided in a slot 7 formed by cross-pieces constituting part of the end wall of the housing, and it is held against lateral play by two series of oppositely disposed guide shoes 8, which project from the rack-plate and straddle the cross-pieces of the frame members.

The rack-plate is formed with two opposite series of gear teeth 9, that mesh with pinions 9′ secured to the shafts 10, which shafts are journaled in the front and rear walls of the housing, and their rear ends have loosely mounted thereon toothed gear wheels 10′ and 10′. Motion is imparted from the shaft 10 to the loose gear wheels 10′ in one direction, by means of a pawl and ratchet connection 11. Hence, as best shown in Figure 5, when the rack-plate is moved from left to right it transmits motion to the upper wheel 10′ (see Figure 7), and upon a reverse motion of the rack-plate, the lower wheel 10′ will be positively rotated in the direction of the arrow, whereby an intermittent rotary motion is imparted to an intermediate gear wheel 12, as indicated by the arrow, due to intermeshing engagement of the train of gears. The intermittent rotation of the gear wheel 12 constantly in the same direction, imparts movement to a counter-shaft 13, through beveled gear connections 13′ from the gear wheel 12, is being understood that the gear wheel 12 and its associated beveled gear are loosely mounted upon a stud 14, which is carried by the housing.

The counter-shaft 13 which is also suitably journaled in the housing, imparts drive to a feed shaft 15 through beveled gears 13″, 13″, the rear end of which feed shaft is journaled in a bracket extending from the housing, and its outer end is suitably journaled in bearings 16 extending from the bed 1, as best shown in Figure 1. The feed shaft 15 is held against endwise movement, and its rear end is in splined union with the beveled gear 13″. Hence when the housing is moved toward the gear blank (to be hereinafter described) the driving connection between the shafts 13 and 15 is maintained, due to the fact that the beveled gear 13″ is capable of longitudinal movement upon the shaft 15.

The shaft 15 is formed in independent sections, as best shown in Figure 4, the same being connected by a differential gear 17. The forward section 15′ of the feed shaft, carries a spur-gear 18 which meshes with the spur gear 18′ through an intermediate gear 18″ (as best shown in Figure 2) that imparts motion to a counter-shaft 19. The counter-shaft carries a worm 19′ that meshes with the worm wheel 20 secured to a blank rotating shaft 21. The shaft 21 is journaled in suitable bearings 22, 22′ that extend from the base, as best shown in Figure 2. A gear blank 23 is mounted upon the shaft 21, and locked to rotate therewith.

The spur-gear element 17″ of the differential, is normally held against rotation by feed mechanism, to be hereinafter described. Hence, when the feed shaft section 15 is rotated in the direction of the arrows, (Figure 4), it will transmit motion to the feed shaft section 15′ in a reversed direction and at the same speed, due to the beveled gear driving connections of the differential gear elements, between the independent shaft sections.

Thus it will be seen that motion from the main shaft 4 is maintained and transmitted throughout the machine to the blank 23 whereby it is rotated continuously.

A vertically adjustable face-plate 24 is mounted upon the front end of the housing 2, the same being formed with oppositely extending and obliquely disposed slots 24', 24''. The face-plate has a centrally disposed boss 25, which boss is in threaded union with the spindle 25' that is journaled in a bracket 26', which bracket is carried by the housing 2 (as best shown in Figures 3 and 5), whereby the face-plate is vertically adjusted when the spindle is rotated.

Feed is imparted to the spindle through a transversely disposed shaft 26 that is in beveled gear connection with the spindle, the shaft being journaled in the brackets 26'', and an outer bracket 27 that depends from the housing exteriorly of the base. It is understood that the shaft 26 moves with the housing. The wall of the base 1, is, therefore, slotted to permit such movement. The outer end of the shaft 26, as best shown in Figure 11, carries a beveled gear wheel 26', which meshes with a corresponding gear wheel 27'. that is in splined union with a jack-shaft 28. The jack-shaft 28 is journaled in the bearing brackets 16 which extend from the side wall of the base. When the housing is moved back and forth from the base, the beveled gear connection between the shafts 26 and 28 is maintained, due to the fact that the bracket 27 is in sliding engagement with the shaft 28 and moves the gear 27' along the shaft 28 to thereby maintain the driving connection between the beveled gear wheel 26' and 27'.

As best shown in Figures 3 and 11, the jack-shaft 28 has rigidly secured thereto, a gear wheel 17', which is meshed with the differential or compensating gear mechanism whereby the gear wheel 17'' thereof is normally held against rotation.

The jack-shaft 28 is normally locked against its tendency to rotate through its gear connection 17', 17'', with the constantly rotative feed shaft 15'. by a pawl and ratchet mechanism, which holds the shaft against rotation in one direction under normal conditions, and which will feed the shaft in the opposite direction (as indicated by the arrow in Figure 3) under certain conditions.

This pawl and ratchet mechanism comprises a ratchet wheel 29, which is fast on the shaft 28, and a pawl 29' that is mounted upon the rock-arm 30 loose on the shaft. The arm 30 is connected by a link 31 to a lever 31', which lever is fulcrumed to the bracket extending from the base 1.

A coil spring 32 connected to the lever 31 normally urges the rock-arm 30 in a reverse tendency to the direction of rotation of the shaft 28, and this spring movement is, under normal conditions, limited by a trip dog 33'', which trip dog is pivoted to the bed 1.

The counter-shaft 19 carries a wiper cam 33 which is arranged to engage the roller 33' mounted upon the lever 31'. When the rock-arm 30, however, is locked by the trip dog, the lever and its associated anti-friction roller is held under spring tension out of the path of travel of the wiper cam.

Figure 10:
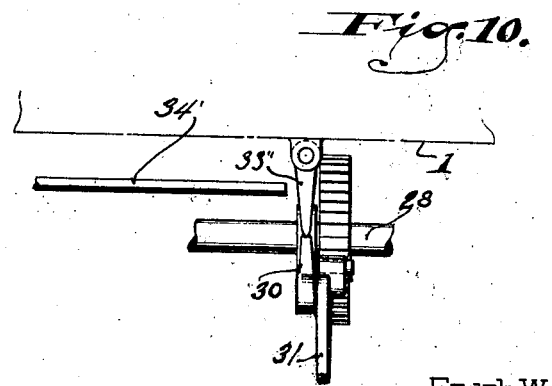
Figure 10 is a detailed plan view illustrating a pawl and ratchet feed mechanism and knock-out tappet.

When the housing is bodily moved upon the base 1, towards the periphery of the gear blank 23, (by feed mechanism to be hereinafter described) at a predetermined speed, the trip dog is released from its engagement with the rock-arm 30 by a tappet rod 34', the same being particularly shown in Figures 1 and 10. The tappet rod is adjustably secured at its rear end to the housing, whereby the time of tripping the dog 33'' is controlled to release the rock-arm, for a feeding movement of the jack-shaft 28. When the trip of the rock arm takes place, the spring controlled lever 31' is shifted to move into the field of travel of the wiper cam. Thereafter the wiper cam exerts a positive oscillatory movement upon the lever 31' in opposition to the spring 32, whereby the pawl and ratchet connection to the jack-shaft 28, will impart thereto an intermittent feed movement resulting through its gear connection with the threaded spindle 25' to cause a downward movement of rack-cutters 34 carried by the face-plate 24, the said cutters being moved in a tangential plane relative to the gear blank and in the opposite direction from the travel of said gear blank.

The housing 2 and its associated rack-cutters are positively fed toward the face of the gear blank by a ratchet-bar 35, which is connected to the housing 2, and guided in the base 1, as best shown in Figures 2, 3 and 4. The ratchet bar is positively fed toward the axis of the blank by a spring controlled rock-lever 36 suitably fulcrumed to the bed. As best shown in Figure 4, the lower end of the rock-lever 36 carries a pawl 36', which pawl normally engages the teeth of the ratchet bar, and the upper end of the rock-lever 36 is provided with an anti-friction roller which is engaged by a tappet lug 37 carried by the blank rotating shaft 21. Hence, with each rotation of the shaft 21, an oscillatory movement is imparted to the rock-lever 36, whereby the housing is positively fed forward a predetermined distance. This feed movement is provided for the purpose of feeding the rack-tooth cutters 34, intermittently, to the work, after each cycle of the gear blank, whereby a multiple series of uniform cuts are developed, progressing from the outer face of the blank to the final depth of the teeth to be formed thereon.

Obviously the tappet lug or cam 37 may, in some instances, be modified, and take the form of an eccentric, in which instance the feed would be continuous and the depth in each cycle of the blank would be in the form of a spiral. The ratchet-bar 35, in this instance, carries a knock-out finger 35', which finger engages the pawl 36 when the ratchet cutters have reached the full depth of the tooth whereby the forward feed of the housing is stopped, due to the fact that the pawl is automatically disengaged from the ratchet teeth of the bar 35.

Figure 9:
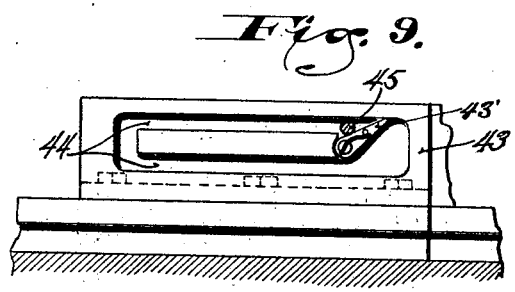
Figure 9 is a detailed bottom faced view of a cam track web for controlling the lift of the rack-cutters from their idle stroke.

The rack-cutters 34 are mounted, (as best shown in Figures 3 and 8), in holders 38, which holders are pivoted to blocks 39 that are adjustably secured to cross-heads 40. The cross-heads are reciprocatively mounted in angularly disposed guides 41, which guides, as best shown in Figure 3, are of equal angles, radiating from a central line intersecting the path of travel through the gear blank. Each cross-head has a stud 42 extending rearwardly thereof, through the apertures 24', 24''. These studs, as best shown in Figure 6, engage vertically disposed grooves 42', formed in the front of the rack-plate 6. Hence, as the rack-plate is reciprocated, by its crank disk connection 4', 5', the cross-heads are alternately reciprocated in their guides 41, and when each rack-bar, upon its cutting stroke, (as best shown in Figure 8), reaches a central line with relation to the path of travel of the blank, it will momentarily stop, preparatory to its return idle stroke. When this stop of the rack-cutter takes place, owing to the fact that the driving connections between the main shaft 4 and feed of the blank are related, the gear blank will also come to rest momentarily. When the rack-cutter is at the end of its cutting stroke (see Figure 8), it is designed to be lifted from the periphery of the gear blank. For this purpose I provide a one-way gate-cam (as shown in Figure 9). Each gate-cam comprises a plate 43 secured to its associated guide 41. The face of the plates are provided with rectangular grooves 44, into which grooves a pin 45 is adapted to travel, the pin being extended upwardly from the oscillatory tool holder.

When the rack-tooth cutter reaches the end of its cutting stroke, the pin 45 passes beyond the spring controlled gate 43', that extends across the cam track or groove 41. Hence when the gate closes and the rack-cutter starts upon its return idle stroke, it will be deflected or lifted from its engagement with the gear blank, oscillating in opposition to its spring tension upon its pivot connection with the block 39, permitting the cutting tool to clear the work. The guides 41 are shown connected to the face plate 24 by pivot pins 41', and said guides are thus rendered adjustable about the axis of the pivot pins to compensate for variation in the angle selected for travel of the rack-teeth. After adjusting the plates they are locked in adjusted position by a suitable screw and slot connection 41'' on the face-plate.

In order to maintain the rack-teeth so that they will swing outward from the gear blank upon a true horizontal plane, the blocks 39 which carry the oscillatory holders, are also adjustably mounted upon the cross-heads 40, the same being swung in adjusted positions about the axis of their respected studs and locked by a suitable bolt and slot connection 46 to the associated cross-heads.

It is understood that all of these details of construction are within the knowledge of a skilled mechanic and form no part of my invention, they being simply illustrated to demonstrate one-way in which the machine can be practically built. It should also be understood that while I have shown various mechanical trip and feed mechanisms, they may be varied within the knowledge of the skilled mechanic.

It will be seen that the blank travels a half tooth for each working stroke of each cutter across the blank and, therefore, as the cutters alternately operate upon the blank, such blank will be advanced one tooth for each complete oscillation of the member 6. In this manner correct indexing, that is to say, correct advancing of the blank for each successive working stroke of the cutters, is secured. It is to be understood that if it is found desirable, the blank may be advanced two teeth, three teeth, or any whole member of teeth, for each complete oscillation of the member 6.

It is to be noted that inasmuch as the blank is travelling upwardly, while the cutter is performing its cutting action and moving in a downwardly slanting direction, it is necessary that the angle of the line of travel of the cutter be less than the angle of the teeth. In other words, the cutter must be aimed, or pointed, at a point, upon the upwardly travelling face of the blank, in advance of the point at which the inner end of the tooth is located. As shown, in Figure 12, the cutter is pointed, or aimed, at the point Y in advance of the actual terminal or inner end of the tooth. The reason for this, of course, is that the angularly downward travel of the cutter and the upward travel of the cutter and the upward travel of the adjacent side of the blank are additive and together determine the angle of the teeth.

This upward travel of the face of the blank is necessary both in order to aid in properly generating the teeth and also to position the blank correctly for the next, or succeeding cut, thereby securing correct indexing.

From the foregoing it will be seen that when power is applied to the main shaft 4, the rack-teeth cutters will be reciprocated back and forth, by the crank disk and through its gear connection the gear-blank will slowly rotate. When the tool, upon its cutting stroke has reached the center line of the blank, it will automatically withdraw from the cut. At the same time the companion tool or rack-cutter will start upon its working stroke to develop the width of the cut between the teeth of the next blank interstice, that is, while each cutter is upon its working stroke, the blank will move approximately one-half tooth, for example, and consequently the next cut will be upon the opposite face of the tooth from that previously cut. The rolling motion, due to the movement of the blank and also simultaneous movement of the cutter transversely, will develop each tooth in a series of flat planes as illustrated in Figure 13.

After a series of the revolutions of the gear-blank has been affected, to complete the cutting of teeth thereto, the trip dog 33 will be acted upon, by the tappet rod 34. Simultaneously with this tripping action, the knockout finger 35' will engage the pawl 36 of the blank feed lever, and hence forward feed of the housing will be stopped, due to the fact that the full depth of the roughly generated teeth have been completed. The feed mechanism tripped by the tappet rod 34 is thus thrown into action, whereby the machine is automatically put into condition for generating the teeth previously rough cut. In this generating operation, the wiper cam 33 will impart rotation to the threaded spindle 25', whereby the face plate carrying the rack-teeth cutters will be gradually moved downward in the direction of the arrow, as shown in Figure 1, while the blank is moved in the opposite direction whereby a compensating action takes place between the rack-cutters and the moving blank to shear off the flats or corners (as indicated at "X", Figure 13) developed in the rough cutting, it being understood that in this generating operation the gear blank is rotated in the same manner as previously described in connection with the rough cutting of the teeth.

It is to be understood that if it is desired, the head may be moved to its innermost position, with the cutters in their most elevated position. The downward feeding may then be commenced and the cutters fed downwardly in a direction opposite to the upwardly traveling adjacent face of the blank. During this operation, the teeth will be partially cut completely around the blank at each revolution of the blank, and when the cutters have moved to their lowest position, the gears will be completely generated and finished.

While I have shown and described one exemplification of my invention, in all of its minute details, it is understood that I may vary such details within the scope of mechanical equivalents and an analysis of the claims, as they may be herinafter interpreted by those skilled in the art.

I claim:

1. A gear cutting machine comprising a rotatable gear-blank carrier, a pair of alternately reciprocative cutters, guides therefor arranged to direct the cut upon the blank transversely thereof and in a line advanced relative to the line defining the walls of the teeth, whereby each cut across the face of the blank is uniform throughout.

2. A gear cutting machine comprising a rotatable gear-blank carrier, a pair of alternately reciprocative cutters, guides therefor arranged to direct the cut upon the blank transversely thereof and in a line advanced relative to the line defining the walls of the teeth, whereby each cut across the face of the blank is uniform throughout, and related driving means between the cutter and blank carrier for imparting movement to both during a cutting operation.

3. A gear cutting machine comprising a rotatable gear-blank carrier, a pair of alternately reciprocative cutters, guides therefor arranged to direct the cut upon the blank transversely thereof and in a line advanced relative to the line defining the walls of the teeth, whereby each cut across the face of the blank is uniform throughout, related driving means between the cutter and blank carrier for imparting movement to both during a cutting operation, means for lifting the cutters after each working stroke, and means for delaying movement of the gear-blank carrier during the lift of the cutters from the work.

4. A gear cutting machine comprising a rotary gear-blank carrier, opposed alternately reciprocative rack cutters, angularly disposed guides therefor arranged to direct the cutters upon the surface of the blank transversely thereof, and in a line advanced relative to the line defining the walls of the finished teeth, whereby each cut across the face of the blank is uniform throughout, means for reciprocating the rack-cutters in synchrony with the movement of the blank carrier in each revolution thereof, and means for feeding the cutters toward the face of the blank a predetermined depth for each revolution thereof, whereby a complete series of teeth are cut and roughly generated in successive steps, to completion in a predetermined series of revolutions of said blank carrier.

5. A gear cutting machine for double helical gears comprising means for continuously rotating a gear blank in a fixed plane, associated alternately reciprocative rack cutters, angularly disposed guides diverging from the plane of rotation of the blank, means for alternately feeding the cutters to the center of the peripheral surface of the blank in synchrony with the peripheral speed of the same a predetermined depth for each revolution, whereby said blank is cut at a uniform depth in each cycle and time controlled means for feeding the rack cutters to a lower depth with relation to the periphery of the blank after each rotation thereof, whereby a complete series of teeth are cut and roughly generated in successive steps.

6. A double helical gear cutting machine comprising a rotary gear-blank carrier, opposed reciprocative rack-cutters, guides therefor arranged at opposite equal angles, diverging from the central plane of rotation of the blank, the angle of the cutter slide being of a different degree relative to the angle of the gear teeth to be cut upon the blank, whereby each cut across the face of said blank is uniform, means for alternately feeding the cutters to the center line of the blank in synchrony with the peripheral speed thereof, time controlled means for feeding the cutters toward the face of said blank a predetermined depth for each rotation thereof, whereby a complete series of teeth are cut about the periphery of the blank in a succession of steps, and a compensating feed connection between the blank feeding means and the rack-cutters for slowly feeding said rack-cutters tangentially to and in the opposite direction from the direction of rotation of the blank after the teeth have been completely rough cut to generate the same, the said compensating feed mechanism being adapted to vary the peripheral speed of the blank to compensate for the movement of the rack-cutters in the opposite direction in said generating operation.

7. A double helical gear cutting machine comprising a rotary blank carrier, angularly disposed alternately reciprocative rack-cutters adapted to travel transversely of the face of the blank to its center, and means for feeding the rack-teeth cutters in a step-by-step movement toward the center of the blank after each revolution thereof, whereby teeth are cut to the desired rough dimensions throughout the periphery of said blank in a series of rotations thereof, means for generating the cut teeth including mechanism for feeding the rack-cutter in the opposite direction from movement of the blank, whereby said blank is retarded from its normal speed of rotation to compensate for the movement of the rack-cutters in a reverse direction.

8. A double helical gear cutting machine comprising a revoluble blank carrier, angularly disposed companion rack-cutters, means for alternately reciprocating the cutters in synchrony with rolling motion of the blank, whereby the cutters alternately develop teeth of the double helical type in the surface of the blank, cutting from its outer edge to the center of said blank a series of helical teeth uninterrupted at their apexes thereof, means for feeding the cutters toward the center of the blank during each cycle thereof, whereby the entire series of teeth are cut and roughly generated, the angular path of travel of the cutters in their operation upon the blank varying slightly from the angle of the teeth developed, whereby each cut across the face of the blank from its outer edge to its center line is uniform.

9. In a double helical gear cutting machine comprising a continuously rotative gear blank carrier, a pair of angularly disposed rack toothed gang cutters arranged to travel alternately, to the center of the periphery of the blank during its rotation, and means for feeding the cutters toward the periphery of the blank a predetermined distance during rotation thereof, to partially cut all of the teeth completely around the gear blank for each revolution of such blank.

10. A gear cutting machine for developing double helical gears, comprising a rotary blank carrier, a pair of angularly disposed racked tooth cutters, means for alternately reciprocating the same across the face of the blank to its center while said blank is in motion, whereby a like series of tooth cuts progressive in depth are developed, with each stroke of the cutters in the cycle of the blanks' rotation, means for feeding the cutters toward the surface of the blank a predetermined distance during each cycle thereof to finally complete the cutting of the entire series of teeth in the rough by a succession of connected flat surfaces, a compensating driving means under control of the rotative blank carrier for moving the cutters step-by-step in a tangential line of travel, opposite the direction of rotation of said blank, the compensating means serving to retard the speed of rotation of the aforesaid blank carrier to compensate for the reverse movement of the cutters, whereby the intersecting corners of the flat surfaces of the teeth are successively smoothed out to generate the series of previously roughed teeth.

In testimony that I claim the foregoing I have hereunto set my hand at Milwaukee, in the county of Milwaukee and State of Wisconsin.

FRANK WARDEN JURY.